(12) United States Patent
Camacho et al.

(10) Patent No.: US 9,081,944 B2
(45) Date of Patent: Jul. 14, 2015

(54) ACCESS CONTROL FOR PERSONALIZED USER INFORMATION MAINTAINED BY A TELEMATICS UNIT

(71) Applicant: General Motors LLC, Detroit, MI (US)

(72) Inventors: Esteban Camacho, Belleville, MI (US); Dexter Lowe, Sterling Heights, MI (US); Shpetim S. Veliu, Livonia, MI (US); David Lohmeier, Clarkston, MI (US); Scott Otterson, Clinton Township, MI (US); Jeffrey Olsen, Royal Oak, MI (US)

(73) Assignee: General Motors LLC, Detroit, MI (US)

( * ) Notice: Subject to any disclaimer, the term of this patent is extended or adjusted under 35 U.S.C. 154(b) by 42 days.

(21) Appl. No.: 13/924,208

(22) Filed: Jun. 21, 2013

(65) Prior Publication Data

US 2014/0380505 A1  Dec. 25, 2014

(51) Int. Cl.
*G06F 17/30* (2006.01)
*G06F 21/31* (2013.01)

(52) U.S. Cl.
CPC .................................... *G06F 21/31* (2013.01)

(58) Field of Classification Search
CPC ......... G06F 21/31; G06F 21/32; G06F 21/35; G06F 21/44; G06F 21/60; G06F 21/62; H04L 63/10; H04L 63/101; H04L 63/102; H04L 63/104; H04L 63/0861; H04L 63/0869; H04L 63/0876

USPC ...................... 726/1–7, 27–30; 713/168, 182, 713/185–186, 193
See application file for complete search history.

(56) References Cited

U.S. PATENT DOCUMENTS

| | | | |
|---|---|---|---|
| 6,970,703 B2 * | 11/2005 | Fuchs et al. ................. | 455/426.1 |
| 7,917,285 B2 * | 3/2011 | Rothschild ..................... | 701/420 |
| 8,335,502 B2 * | 12/2012 | Oesterling et al. ............. | 455/419 |
| 8,522,320 B2 * | 8/2013 | Kleve et al. ........................ | 726/4 |
| 2008/0071546 A1 | 3/2008 | Beiermeister et al. | |

* cited by examiner

*Primary Examiner* — Hosuk Song
(74) *Attorney, Agent, or Firm* — Leydig, Voit & Mayer, Ltd.

(57) ABSTRACT

A system and method are described herein that enable a vehicle user to establish, store (in a limited access storage location), and restore personalization information for the vehicle user on a vehicle. In particular the system manages personalization information to configure settings for a registered vehicle user in a vehicle including a telematics unit. The system is configured to carry out the method including establishing, for the registered vehicle user, a personalization information dataset within a networked vehicle user database. The system is further configured to submit a request to download the personalization information dataset from the networked vehicle user database, the request identifying the registered vehicle user and the vehicle. The system is also configured to download in accordance with the request to download, via a mobile wireless link to the telematics unit, values from the personalization information dataset to the telematics unit of the vehicle.

22 Claims, 3 Drawing Sheets

ACCESS CONTROL FOR PERSONALIZED USER INFORMATION MAINTAINED BY A TELEMATICS UNIT

FIELD

The present disclosure relates generally to telematics systems and more particularly to systems and associated telematics services provided by a communications center communicatively coupled to installed telematics units via mobile wireless network connections. More particularly, the present disclosure is directed to a use of telematics units to manage personalized user information in a multi-user vehicle environment, more particularly a multi-user shared/rental vehicle environment.

BACKGROUND

Telematics units within mobile vehicles provide subscribers with connectivity to a telematics service provider (TSP). The TSP provides subscribers with an array of services ranging from emergency call handling and stolen vehicle recovery to vehicle system status and diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide subscribers/users with a variety of telematics-facilitated services such as those described herein.

Novel methods of vehicle time sharing have developed in recent years in response to increased opportunities for monetizing the idle capacity of unused vehicles. Automobile rental services have targeted, for example, locations where the costs of owning and storing a vehicle are high relative to potential owners' available cash flows and where potential owners are likely to use vehicles for only a small percentage of the total available time. Meanwhile, more traditional automobile rental business models, such as those that maintain large vehicle fleets in the vicinity of airports to cater to business travelers and vacationers, have remained successful.

Automobile rental services and other automobile owners who intend to rent, loan or share their automobiles with other drivers may maintain accounts linking the telematics units with TSPs to preserve the functionality of telematics units for their customers and/or share groups. In the context of automobile rentals and/or rideshare groups, a certain degree of convenience is often sacrificed by the multiple users with regard to maintaining personalization information often established by/for specific car drivers/users. Examples of such personalization information include: radio station presets, audio settings (volume, balance, equalizer, etc.), imperial/metric, bookmarked websites, seat positions, mirror positions, heater and air conditioner settings, voice commands, voice messages, contact information, destinations (for navigation service), emails, hands-free call minutes, Internet browsing history, etc. Loaning/sharing a car and having it returned with the personalization information and settings changed, accessed and/or deleted can be unpleasant. In the case of a ride sharing arrangement where a vehicle owner potentially allows user of the vehicle by multiple strangers, the protection of personalization information from both access and alteration is especially a concern. The combination of privacy concerns and inconvenience of restoring changed settings may lead vehicle owners to either never use stored/storable settings or decline participating as a car owner in car sharing programs. Similarly, frequent renters/borrowers of shares vehicles face the constant need to spend several minutes adjusting personalization information on the vehicles they use on a shared or temporary basis.

Known systems limit access to certain functional components of a vehicle through user authentication prior to providing access to the functional component. Upon authentication, a user is subsequently permitted to configure access to particular vehicle components. Such systems, including for example the one described in Beiermeister et al., US Pub. No. 2008/0071546, focus upon controlling access to a set of protectable components of a vehicle having a telematics unit. The resulting configuration limits access by other users to particular functional components of the vehicle. Such functional components include a cellular phone, email, ignition, audio, navigation, and climate control.

The above body of information is provided for the convenience of the reader. The foregoing describes a suitable environment for which the described system and method are provided, and is not an attempt to review or catalog the prior art.

BRIEF SUMMARY

A system and method are described herein that enable a vehicle user to establish, store (in a limited access storage location), and restore personalization information for the vehicle user on a vehicle. In particular a system and method are described for managing personalization information used to configure settings for a registered vehicle user in a vehicle including a telematics unit. The system is configured to carry out the method including establishing, for the registered vehicle user, a personalization information dataset within a networked vehicle user database. The system is further configured to submit a request to download the personalization information dataset from the networked vehicle user database, the request identifying the registered vehicle user and the vehicle. The system is also configured to download in accordance with the request to download, via a mobile wireless link to the telematics unit, values from the personalization information dataset to the telematics unit of the vehicle.

In a further implementation, the present invention is implemented as computer-executable instructions stored on a tangible, non-transitory computer-readable medium that is part of a telematics unit.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Before discussing the details of the invention and an environment wherein the invention may be used, a brief overview is given to guide the reader. In general terms, not intended to limit the claims, a system and method are described herein that leverage application support and data storage and mobile wireless communication capabilities of a telematics unit in a vehicle to support user-specific personalization information management functionality for users of the vehicle and the telematics unit contained therein. The telematics unit in the vehicle stores personalization information for an authenticated vehicle user. The personalization information includes a variety of vehicle settings (e.g., radio station pre-sets) and personal (e.g., voicemail messages) information.

A personalization information management service incorporated into the telematics unit stores the personalization information for the authenticated vehicle user in a securable memory storage space. The personalization information for the authenticated vehicle user is not accessible to other vehicle users—i.e. cannot be read or overwritten. However, upon re-authentication of the authorized user, the telematics unit permits access by the authorized user to the personalization information stored in the securable memory storage space to: restore the vehicle settings to the authorized user's vehicle settings and enable retrieval of the personal information by various telematics unit-related services (e.g., voicemail, email, navigation destinations, etc.) that retrieve and play/display the personal information. Such re-authentication can be carried out in a variety of ways including: sensing an RFID chip in the vicinity of the telematics unit, or alternatively matching stored user identification/authentication information against user identification/authentication information entered via a text input, voice/speech recognition interface, fingerprint reader, etc. Upon authenticating the authorized user, the personalization information management service may, in response to a simple act (e.g. pushing a button, issuing a voice command), restore previously altered vehicle settings based upon the settings maintained for the authorized user in the securable memory storage space.

As such the disclosed personalization information management service carried out on the telematics unit enables the authorized user to share the vehicle with other users without worry/annoyance/concern that the authorized user's personalization information will be accessed and/or altered by the other drivers/users of the vehicle.

Figure 1:
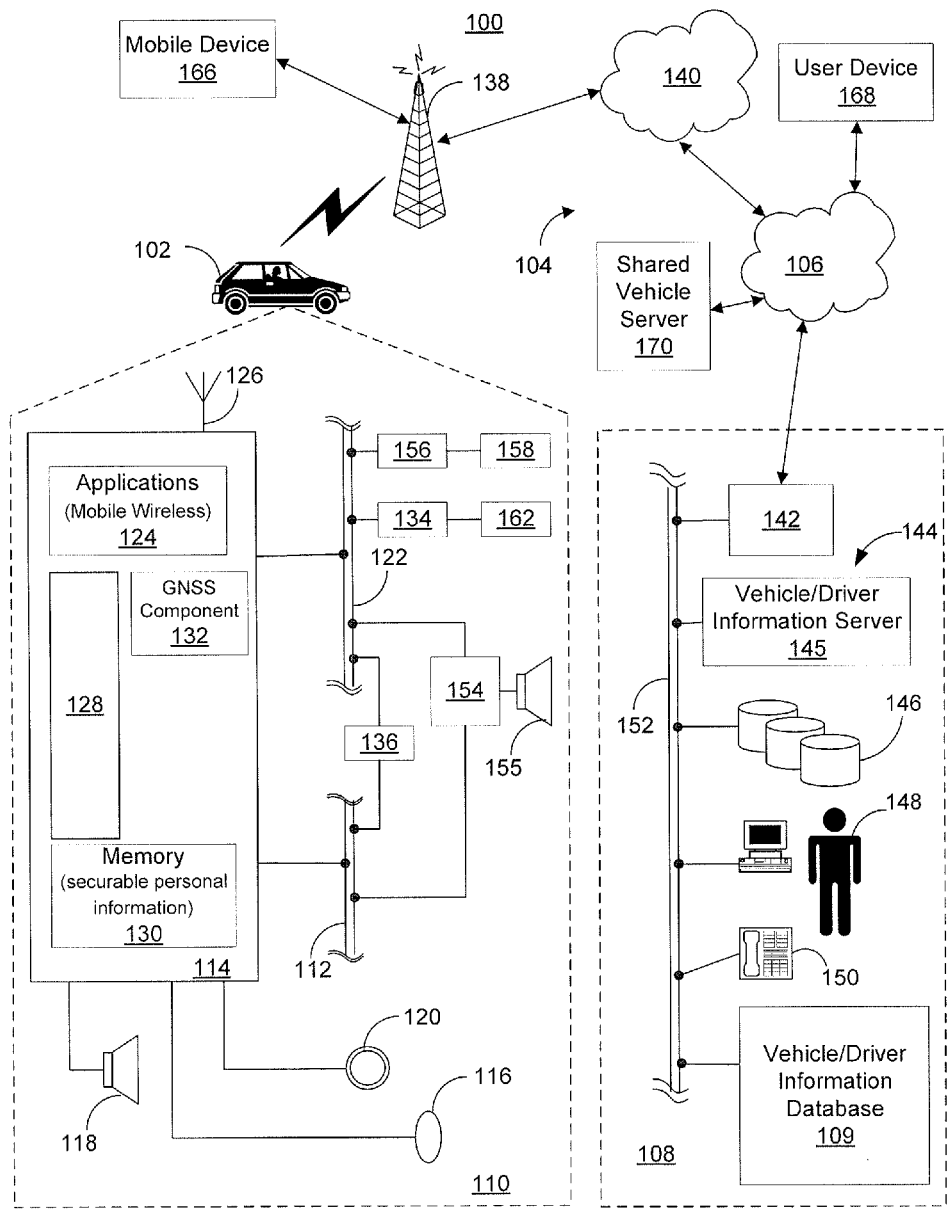
FIG. 1 is a schematic diagram of an operating environment for a mobile vehicle communication system usable in implementations of the described principles.

An exemplary computing and network communications environment is described hereinafter. It will be appreciated that the described environment is an illustrative example, and does not imply any limitation regarding the use of other environments to practice the invention. With reference to FIG. 1 there is shown an example of a communication system 100 that may be used with the present method and system to pass vehicle and driver information. The communication system 100 generally includes a vehicle 102, a mobile wireless network system 104, a land network 106 and a communications center 108. It should be appreciated that the overall architecture, setup and operation, as well as the individual components of the communication system 100 is generally known in the art.

In accordance with an illustrative example, the communication center 108 includes a vehicle user database 109. The vehicle user database 109, incorporating functional components facilitating updates to vehicle user tables maintained on the vehicle user database 109. The vehicle user tables contain vehicle user records, each vehicle user record corresponding to a collection of personalization information stored for an identified user. The content of an exemplary record structure maintained by the vehicle user database 109 is described herein below with reference to FIG. 2. However, in general, the vehicle user record for a particular identified vehicle user includes: a user identification, user authentication information, user authorization information, personal information, and vehicle settings. As such, individual vehicle user records, including a variety of personalization information types, are stored and accessed via the vehicle user database 109 to facilitate a highly portable vehicle user personalization profile for convenient personalization of vehicles used by multiple users, and as well as multiple vehicles used by a single user. Such vehicle user personalization profile for an identified user is downloaded and installed upon selected vehicles including telematics units configured to receive and install such profiles via communications between telematics units within such vehicles and the communications center 108.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, a telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114. The telematics unit 114 comprises an operating system including computer-executable instructions facilitating integration of the various identified components within the telematics unit 114. The functionality regarding management of personalization information for vehicle users may be incorporated into the operating system of the telematics unit 114.

The mobile wireless component 124, by way of example, may also include applications (e.g. mobile wireless applications). In an implementation, the management of personalization information for vehicle users is carried out by a personalization information management application comprising stored computer-executable instructions executed by the electronic processor 128 to facilitate managing personalization records for identified vehicle users. In this implementation, the personalization information management application executes on the telematics unit 114 with the aid of the operating system of the telematics unit.

By way of example, managing personalization records for identified vehicle users includes, for a given identified vehicle user: creating a personalization record, storing the personalization record at least in the electronic memory 130, providing the personalization record information to requesting applications executing on the telematics unit 114, including the personalization application. Access to the personalization record 130 is limited such that personal information within the personalization record is only provided for/to an identified, authenticated and authorized recipient (e.g. identified-authenticated vehicle user). The content of personalization records and the functionality of managing the personalization records are described herein below with reference to FIGS. 2, 3, 4, 5 and 6.

The telematics unit 114 provides, for users, an extensive/extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle. The telematics unit 114 also supports receiving and forwarding to a vehicle user database 109, via the mobile wireless component 124, a variety of sensor readings relating to operation of the vehicle 102. Moreover, the telematics unit 114 (mobile wireless component 124 applications executing on the electronic processor 128) support uploading/downloading personalization information for an identified vehicle user from/to the memory 130 to/from the vehicle user database 109. Such uploading/downloading occurs upon request by the authenticated identified vehicle user or automatically in response to a triggering event such as a first ignition on by an identified vehicle user differing from a previously identified vehicle user associated with a current configuration of the vehicle settings and/or personal information.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback within the memory 130 as part of personalization information downloaded from the vehicle user database 109 to the telematics unit 114 for a currently identified-authenticated vehicle user.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

The telematics unit 114 uses radio transmissions to establish communications channels with the mobile wireless network system 104 so that voice and/or data signals, including ones containing data corresponding to personalization information for an identified vehicle user, can be sent and received via the communications channels. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component 132.

The microphone 116 provides the driver or other vehicle occupant with an interface for inputting verbal or other auditory commands to the telematics unit 114, and can be equipped with an embedded voice processing unit utilizing a human/machine interface (HMI) technology known in the art. The microphone 116 may be used to receive spoken words and/or phrases from an identified vehicle user that are thereafter processed by the mobile wireless component 124 and electronic processor 128 to identify and authenticate a vehicle user before authorizing access to personalization information relating to the identified vehicle user. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control. Data from the sensor interface modules 134 is provided to automobile electronic control units, including an engine control unit (ECU), not shown in FIG. 1.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSC 140 includes a remote data server.

As appreciated by those skilled in the art, the mobile wireless network system 104 includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144 (including a vehicle user information server 145), databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The servers 144, as noted above, include the vehicle user information server 145. By way of example, the vehicle user information server 145 is configured with an Internet interface facilitating providing vehicle user personalization information services to a variety of requestors/providers of personalization information for identified vehicle users. In a typical scenario, the vehicle user information server 145 receives a request relating to personalization information for an identified vehicle user. Such requests, including requests to store and/or retrieve personalization information for an identified vehicle user, are thereafter executed by the vehicle user information server 145 on the vehicle user database 109. Such requests are initially subject to verifying whether the request is authorized. Moreover, the need for such requests to be authenticated/authorized may depend upon the type of request (read/write) and the sensitivity of the information (e.g. radio channel presets, voicemail, navigation destinations, etc.) and the level of sensitivity and need for authentication/authorization may be designated on an individual information item basis with such designation being maintained separately in a security field for a type of information within the personalization information record for an vehicle user stored on the vehicle user database 109.

To that end, the vehicle user information server 145 is configured with a database query interface facilitating submitting structured queries to the vehicle user database 109 and receiving/processing subsequent responsive vehicle user personalization information. In general, the vehicle user information server 145 responds to requests from users, acquires responsive (permitted) personalization data based upon relevant records within the tables maintained by the vehicle user database 109, applies data filters to the responsive personalization data (e.g., applying an authorization level distinguishing potential types of requestors of personalization information for an identified vehicle user and security settings associated with items of retrieved vehicle user personalization information), and forwards the responsive filtered personalization information to the requestor. The functionality of the vehicle user information server 145 is described further herein below.

Figure 2:
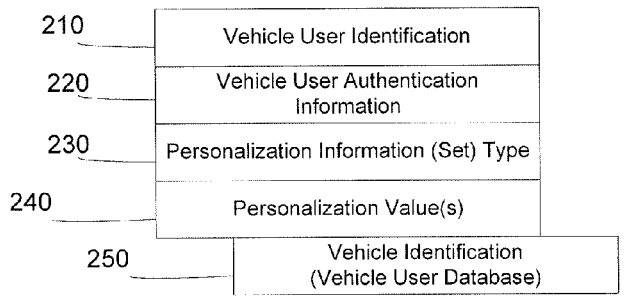
FIG. 2 is an exemplary set of fields contained in a configuration message issued to a vehicle user information server for uploading vehicle user personalization information to a vehicle user database.

Various implementations of the system for managing personalization information for identified vehicle users include a variety of Internet Web page-based interfaces for users to configure their personalization information managed by the vehicle user information server 145 and maintained for a particular vehicle user on both the vehicle user database 109 and the memory 130 of the telematics unit 114. Turning briefly to FIG. 2, the submissions of vehicle user personalization information to servers/applications responsible for committing the personalized information to a database include, by way of example: a vehicle user identification 210, vehicle user authentication information 220 (ensure security and privacy), personalization information 230 type, and a personalization value 240. Additionally, a single personalization information submission may include multiple pieces (a set) of personalization information of various types—as opposed to a single personalization value of a single type depicted in FIG. 2.

In addition to securely storing vehicle user personalization information in the memory 130 to facilitate protection of such information from other users of the vehicle 102, it is contemplated that such information is also maintained within the vehicle user database 109 to facilitate both: (1) recovery of the personalization information lost from the memory 130, and (2) portability of the personalization information to multiple other vehicles potentially used by the vehicle user. In such cases, a personalization information submission to the vehicle user information server 145 includes a vehicle identification 250 for a vehicle with which the provided information is intended to be associated to facilitate remotely restoring the personalization information maintained in the memory 130 for the vehicle 102.

Figure 3:
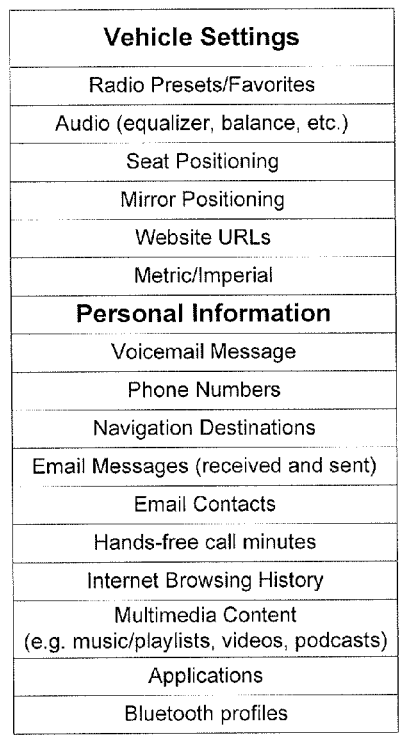
FIG. 3 is an exemplary set of personalization information types for a particular vehicle user that are maintained for a vehicle and protected from access by other users of the vehicle in a rental/shared vehicle environment.

Turning to FIG. 3, a listing of exemplary personalization information types are provided including the general categories of vehicle settings and personal information. Vehicle settings are generally not private/sensitive in nature and thus may remain available to others. Personal information are generally private/sensitive in nature and of a type that the general public should not have free access. The vehicle settings category includes: radio presets (channels/stations), audio settings (e.g., balance, bass, treble, mid-range, fade), seat positioning (forward/back, seat incline, back incline), mirror positioning, website URLs, Metric/Imperial measurements, etc. The Personal Information category (information that is generally not available to others) includes: voicemail messages, phone numbers (called/received caller lists), navigation destinations, email messages (received/sent), email contacts, hands-free call minutes, Internet browsing history, multimedia content (music, playlists, videos, podcasts, etc.), application programs/applets, Bluetooth profiles, etc. While all the personalization information is stored for the vehicle user in the memory 130, the general category of the information (may be customized by the vehicle user) may be used to determine the subsequent handling of the information when the vehicle 102 is used by another driver. As noted above, the category may be used to determine whether the values are cleared and corresponding information locked in the memory 130 when the vehicle 102 is used by another.

The requests/submissions to store personalization information are received, for example, by the vehicle user information server 145 via an Internet page accessed by drivers/users through a browser application of the mobile wireless component 124. Additionally, such requests are submitted via browser applications running on computing devices such as the mobile devices 166 and user device 168 (e.g. a desktop or laptop computer using a hardwire or Wi-Fi interface in a non-mobile environment).

Regardless of the request source type, vehicle user personalization information access requests are executed in the context of an authenticated session and carried out in accordance with authorizations associated with an authenticated identified source of a request relating to the personalization information for an identified vehicle user.

Figure 4:
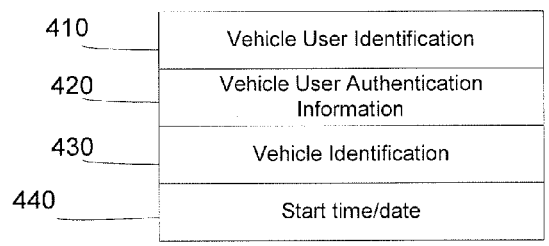
FIG. 4 is an exemplary set of fields contained in a scheduling request message for an identified vehicle user for an identified vehicle at a specified time.

A third party source of vehicle user personalization information download scheduling is contemplated in various implementations of the vehicle user personalization information management system described herein. In the illustrative example of FIG. 1, a shared vehicle server 170 comprises an interface for receiving requests to schedule a use of an identified vehicle (e.g. vehicle 102) by an identified vehicle user for which downloading previously stored vehicle user information from the vehicle user database 109 is desired. Turning briefly to FIG. 4, the shared vehicle server 170, based upon interactions with requesting users (e.g. via a Web page interface to vehicle user browser applications), generates a scheduled use record including: a vehicle user identification 410, vehicle user authentication information 420 (ensure security and privacy), a vehicle identification 430, and a start time/date 440. The list of elements of the scheduled user records is not limited to the ones listed in FIG. 2. For example, the scheduled use record may also include a listing of the personalized information types (i.e. a subset of an entire collection of potentially downloadable personalization information) that should be included in the download for the identified vehicle user to the identified vehicle.

It is contemplated that requests to schedule and actually initiate a download of personalization information for an identified vehicle user (stored in the vehicle user database 109) to an identified vehicle may come from any of a variety of authorized sources. By way of example, the shared vehicle server 170 is configured to maintain a time-sorted listing of pending personalized information downloads, corresponding to the scheduled use records. Moreover, the shared vehicle server 170 is configured to process the time-sorted listing. By way of a particular example, the shared vehicle server 170 is configured with a scheduler process that maintains a listing of scheduled start times for temporary uses of identified vehicles by identified vehicle users having personalized information records maintained on the vehicle user database 109. At an appropriate point in time, such as at a time when the scheduled use is about to begin, the scheduler process running on the shared vehicle server 170 issues a request to the vehicle user information server 145 to commence downloading personalized information (stored in the vehicle user database 109) for an identified user based upon a specified time, to an identified vehicle.

While identified as a single server in FIG. 1 (primarily for clarity), the shared vehicle server 170 can operate as one of many such servers that schedule and initiate download requests to the vehicle user information server 145. Alternatively, the shared vehicle server 170 operates as an aggregator of requests from other servers that receive and forward requests for particular users (e.g. car rental agencies) in a hierarchical request handling scheme. Yet other embodiments contemplate a hybrid arrangement including a combination of direct requestors and aggregators of scheduling requests. In yet another embodiment, the vehicle user information server 145 incorporates the above-described scheduling functionality of the shared vehicle server 170 regarding maintaining and processing scheduled downloads. In that case, the shared vehicle server 170 (and other similar servers for multiple car rental/share agencies) are responsible for providing the download request at any time prior to the actual download time. The vehicle user information server 145 handles the actual scheduling of downloads corresponding to the requests.

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 5:
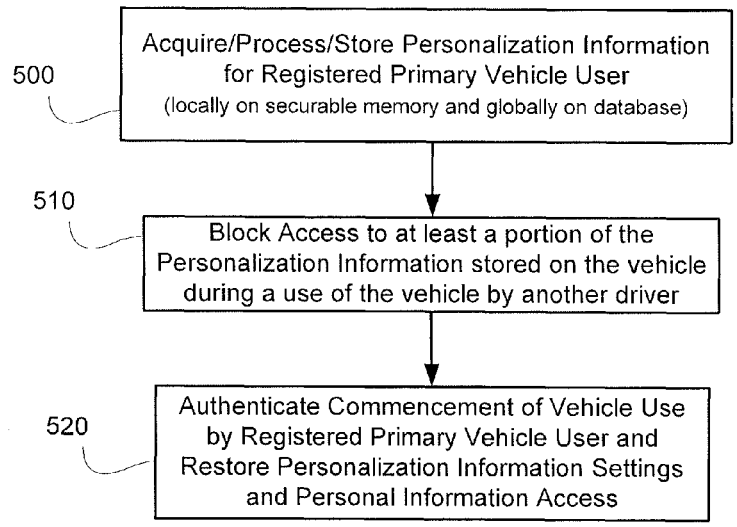
FIG. 5 is a flowchart illustrating a process enabling a vehicle user to maintain personalization information for the vehicle user relating to the vehicle such that access to the personalization information is limited to authenticated users of the vehicle.

Having generally described an environment wherein vehicle user personalization information is managed both locally and globally, attention is now directed to exemplary ways in which the above-described system operates. The activities/actions summarized in FIG. 5 depict an exemplary sequence of events and actions illustrating the functionality of the system described with reference to FIGS. 1-4. In particular, the sequence summarizes how the system protects and restores previously configured personalization information for a primary vehicle user for the vehicle 102 that has previously registered as the primary vehicle user—at least with respect to management of the personalized information stored in memory 130 of the vehicle 102. During registration of the primary vehicle user, a vehicle identification associated with the vehicle 102 is linked to a unique identification for the primary vehicle user. In addition, authentication information (e.g. a password, a voice print, RFID tag code, etc.) is linked to the primary vehicle user. It is noted that the primary vehicle user can, in fact be multiple distinct entities that are identified as a primary vehicle user for the vehicle 102. Moreover, rather than having a single identifier, each one of the primary vehicle users may be distinguished from other registered primary users of the vehicle 102. Moreover, the memory 130 may be partitioned to provide a separate space for each of the concurrently designated, uniquely identified, primary vehicle users for the vehicle 102.

Initially, during a stage 500, the previously registered primary vehicle user of the vehicle configures personalization information (see FIG. 4) that is stored within memory 130 in a secure manner to ensure privacy and facilitate restoration of settings after use of the vehicle 102 by another. Thus, during stage 500, changes made by the primary vehicle user to a vehicle setting or personal information are updated in the memory 130. The personalization information stored in the memory 130, or at least a portion thereof, is also uploaded from the telematics unit 114 to the vehicle user database 109 through update requests to the vehicle user information server 145 originating from the telematics unit.

During stage 510, at least a portion of the personalization information maintained in the memory 130 is blocked during use of the vehicle 102 by another vehicle user. During stage 510, during the course of using the vehicle 102, the other vehicle user may change settings on the vehicle (e.g., radio presets, mirror positions, stored seat positions, etc.). However, the values for these vehicle settings that were previously used by the primary vehicle user (during stage 500) are maintained in the memory 130 and cannot be changed by the current (non-primary) vehicle user. Moreover, during operation of the vehicle during stage 510, the other vehicle user cannot even access any of the personal information contained within the personalization information stored in the memory 130.

In an alternative implementation, during stage 510 any vehicle setting designated as being of a personalized information type by the primary vehicle user cannot be changed by another (non-primary) vehicle user. Thus, in the alternative implementation, vehicle settings, while not sensitive in nature, are still protected in the sense that they can only be observed and cannot be changed by another vehicle user.

Thereafter, during stage 520, the vehicle 102 is again used by the primary vehicle user. Upon authentication of the primary vehicle user, during stage 520 a vehicle settings restoration operation takes place wherein the previously stored vehicle setting values are compared to current vehicle settings (possibly altered during use by the other vehicle user) on the vehicle 102. To the extent the vehicle settings values differ, the vehicle settings corresponding to the values stored in the memory 130 are restored on the vehicle 102. Moreover, access to the personal information within the memory 130 is again restored to various applications (e.g. email) that utilize such information.

Figure 6:
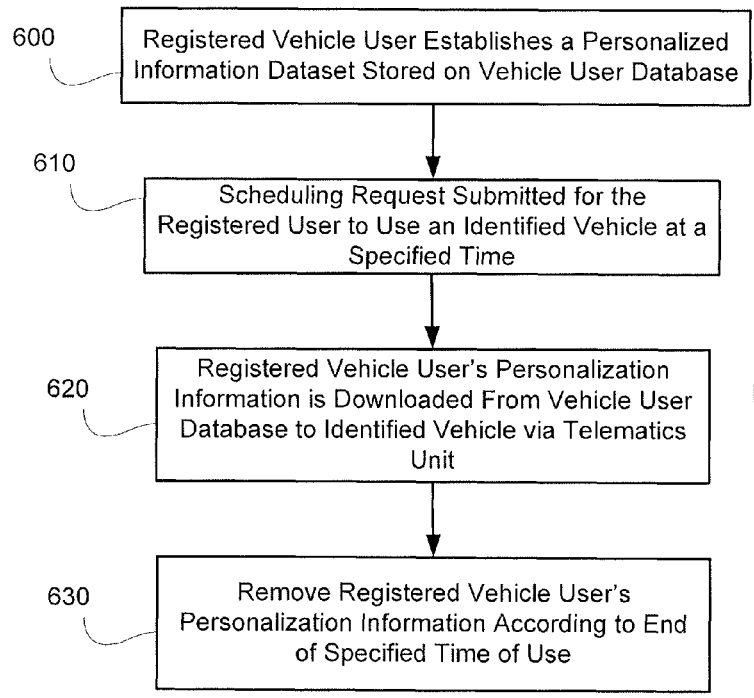
FIG. 6 is a flowchart illustrating a process for configuring a vehicle with vehicle user information previously uploaded to a vehicle user database.

Turning to FIG. 6, a sequence of stages summarize an exemplary further use of vehicle user personalization information data sets that exploits a portability aspect of such personalization information when uploaded to the vehicle user database 109 and accessed via the vehicle user information server 145. During stage 600, a vehicle user registers (e.g. acquires a unique user identification and authentication information) with the vehicle user information server 145 and builds a personalization information dataset including information of the type summarized in FIG. 3. Such information may be accumulated in the memory 130 of the vehicle 102 and uploaded to the vehicle user database 109, or alternatively using a browser application to access a configuration Web page supported by the vehicle user information server 145 (or another server that subsequently stores the personalization information in the database 109 via the server 145).

Thereafter, during stage 610 a scheduling request is submitted for the registered user including information corresponding to the information fields discussed herein above with reference to FIG. 4. Such request thus includes identification of the vehicle, the registered user identification and authentication information, and a specified time (e.g. a start time and an end time) for use of the identified vehicle.

Thereafter, during stage 620, at an appropriate point in time (e.g. upon commencement of the specified time of use of the vehicle 102 by the registered user) the vehicle user information server 145 executes a scheduled download of the registered user's personalization information to the identified vehicle in accordance with the scheduling request submitted during stage 610. The triggering of the download operation may occur in accordance with a scheduled beginning of a period of use by the registered user of the vehicle. Alternatively and/or additionally, the download operation is triggered by a request message from the telematics unit 114. The request message is issued, for example, after a specified start time, in response to the registered user carrying out a successful authentication procedure on the telematics unit or other security interface on the vehicle 102 during a period of use.

In particular, during stage 620 the vehicle user information server 145 issues a request to the vehicle user database 109 to provide the previously stored personalization information for the registered user. Upon receipt of the requested personalization information, the vehicle user information server 145 downloads the requested personalization information to the identified vehicle (vehicle 102) via the telematics unit 114. The personalization information for the registered user, through operations performed under instruction from the mobile wireless component 124 of the telematics unit 114, is thereafter applied to and accessed by the various relevant systems and applications on the vehicle 102 without any need by the registered user to enter such values manually.

The operations executed during stage 620 may, in some instances, conflict with the primary vehicle user setting protections previously discussed herein above with reference to FIG. 5. In such instances, the conflicting functionalities are resolved in favor of the primary vehicle user protections. Thus, vehicle settings for the registered user downloaded during step 620 may be blocked by the telematics unit 114 in view of conflicts with protected vehicle settings of the primary vehicle user of the vehicle 102. This can be resolved by a store/restore functionality supported by the telematics unit 114 with regard to settings of the primary vehicle user (also discussed herein above with reference to FIG. 5).

Moreover, the downloading of settings during stage 620 may be used to protect the privacy of a previous user of the vehicle 102. In particular, regardless of whether the registered user has setting values downloadable to the vehicle 102, the vehicle user information server 145 downloads replacement (default) setting values to the vehicle 102, prior to the specified time, to replace the personal settings of a previous user of the vehicle 102.

Thereafter, in accordance with the ending of the specified time (e.g. a specified end time) for use of the identified vehicle by the registered user, during stage 630, the previously stored personalization information is removed from the identified vehicle. The removal can occur in a variety of ways including replacing the current settings and information by default values, values specified by a scheduled download for a next registered user of the identified vehicle. For example, in a case where the identified vehicle, owned by a registered primary vehicle user, was temporarily used by the registered user, personalization information (e.g. settings) of the primary vehicle user is restored in place of the settings previously established by the registered user during the specified time of temporary use.

It will thus be appreciated that the described system and method allows for reliable management of vehicle user personalization information both locally and via over-the-air submission, via telematics units, of vehicle user personalization information for storage to and later access from a vehicle user information database. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for limiting access to personalization information for a registered primary vehicle user for a vehicle including a telematics unit, the method comprising:
   storing personalization information of the registered primary vehicle user within a non-transitory memory;
   blocking, after the storing, access to the personalization information of the registered primary vehicle user during use of the vehicle by a driver that has not been authenticated as the registered primary vehicle user;
   permitting a change to a first setting value on the vehicle by the driver that has not been authenticated as the registered primary vehicle user;
   authenticating, after the storing, the registered primary vehicle user;
   providing, in response to successful authentication of the registered primary vehicle user during the authenticating, access to the personalization information for the registered primary vehicle user; and
   restoring, after the permitting and authenticating, the first setting value on the vehicle, based upon a setting value stored in the non-transitory memory.

2. The method of claim 1, wherein during a registering step, prior to the storing, a unique vehicle user identification and an authentication information element are associated with the registered primary vehicle user of the vehicle.

3. The method of claim 1, wherein the registered primary vehicle user is one of multiple uniquely identified registered primary vehicle users for which personalization information is stored in the non-transitory memory.

4. The method of claim 3, wherein each of the multiple registered primary vehicle users is allocated a distinct partition of the non-transitory memory into which personalization information for each of the multiple uniquely identified registered primary vehicle users is stored, respectively.

5. The method of claim 1, further comprising:
   updating a previously stored personalization information element in the non-transitory memory.

6. The method of claim 1, further comprising:
   uploading at least a portion of the personalization information for the registered primary vehicle user to a vehicle user database via a mobile wireless interface of the telematics unit.

7. The method of claim 6, further comprising:
   downloading, from the vehicle user database, at least a portion of the personalization information for the registered primary vehicle user to a vehicle currently being used by the registered primary vehicle user.

8. The method of claim 7, wherein the vehicle currently being used is not the vehicle for which the registered primary vehicle user is a registered primary vehicle user.

9. The method of claim 1, further comprising:
   allowing use of a first personalization information element value, on the vehicle, by the driver that has not been authenticated as the registered primary vehicle user; and
   blocking a change to the first personalization information element value by the driver that has not been authenticated.

10. The method of claim 1, further comprising:
   restoring vehicle settings from the personalization information stored in the non-transitory memory, after the authenticating.

11. The method of claim 1, wherein the providing access comprises providing access by the registered primary vehicle user to data files associated with an application program executing on the telematics unit.

12. A non-transitory computer-readable medium including computer-executable instructions for limiting access to personalization information for a registered primary vehicle user for a vehicle including a telematics unit, the computer-executable instructions facilitating carrying out a method comprising:
storing personalization information of the registered primary vehicle user within a non-transitory memory;
blocking, after the storing, access to the personalization information of the registered primary vehicle user during use of the vehicle by a driver that has not been authenticated as the registered primary vehicle user;
permitting a change to a first setting value on the vehicle by the driver that has not been authenticated as the registered primary vehicle user;
authenticating, after the storing, the registered primary vehicle user;
providing, in response to successful authentication of the registered primary vehicle user during the authenticating, access to the personalization information for the registered primary vehicle user; and
restoring, after the permitting and authenticating, the first setting value on the vehicle, based upon a setting value stored in the non-transitory memory.

13. A system for managing limited access to personalization information for a registered primary vehicle user for a vehicle, the system including:
a telematics unit including an electronic processor and computer-executable instructions facilitating carrying out a method comprising:
storing personalization information of the registered primary vehicle user within a non-transitory memory;
blocking, after the storing, access to the personalization information of the registered primary vehicle user during use of the vehicle by a driver that has not been authenticated as the registered primary vehicle user;
permitting a change to a first setting value on the vehicle by the driver that has not been authenticated as the registered primary vehicle user;
authenticating, after the storing, the registered primary vehicle user;
providing, in response to successful authentication of the registered primary vehicle user during the authenticating, access to the personalization information for the registered primary vehicle user; and
restoring, after the permitting and authenticating, the first setting value on the vehicle, based upon a setting value stored in the non-transitory memory.

14. The system of claim 13, wherein the telematics unit is configured to maintain personalization information in the non-transitory memory for multiple uniquely identified registered primary vehicle users, including the registered primary vehicle user.

15. The system of claim 13, wherein the telematics unit further comprises a mobile wireless interface, and wherein the telematics unit is further configured to upload at least a portion of the personalization information for the registered primary vehicle user to a vehicle user database via the mobile wireless interface of the telematics unit.

16. The system of claim 13, wherein the telematics unit is further configured to:
allow use of a first personalization information element value, on the vehicle, by the driver that has not been authenticated as the registered primary vehicle user; and
block a change to the first personalization information element value by the driver that has not been authenticated.

17. The system of claim 13, wherein the telematics unit is further configured to restore vehicle settings from the personalization information stored in the non-transitory memory, after the authenticating.

18. The system of claim 13, wherein the telematics unit is further configured to provide access by the registered primary vehicle user to data files associated with an application program executing on the telematics unit.

19. A method for limiting access to personalization information for a registered primary vehicle user for a vehicle including a telematics unit, the method comprising:
storing personalization information of the registered primary vehicle user within a non-transitory memory;
uploading at least a portion of the personalization information for the registered primary vehicle user to a vehicle user database via a mobile wireless interface of the telematics unit;
blocking, after the storing, access to the personalization information of the registered primary vehicle user during use of the vehicle by a driver that has not been authenticated as the registered primary vehicle user;
authenticating, after the storing, the registered primary vehicle user;
providing, in response to successful authentication of the registered primary vehicle user during the authenticating, access to the personalization information for the registered primary vehicle user; and
downloading, from the vehicle user database, at least a portion of the personalization information for the registered primary vehicle user to a vehicle currently being used by the registered primary vehicle user;
wherein the vehicle currently being used is not the vehicle for which the registered primary vehicle user is a registered primary vehicle user.

20. The method according to claim 19, further comprising:
permitting a change to a first setting value on the vehicle by the driver that has not been authenticated as the registered primary vehicle user; and
restoring, after the permitting and authenticating, the first setting value on the vehicle, based upon a setting value stored in the non-transitory memory.

21. A non-transitory computer-readable medium including computer-executable instructions for limiting access to personalization information for a registered primary vehicle user for a vehicle including a telematics unit, the computer-executable instructions facilitating carrying out a method comprising:
storing personalization information of the registered primary vehicle user within a non-transitory memory;
uploading at least a portion of the personalization information for the registered primary vehicle user to a vehicle user database via a mobile wireless interface of the telematics unit;
blocking, after the storing, access to the personalization information of the registered primary vehicle user during use of the vehicle by a driver that has not been authenticated as the registered primary vehicle user;
authenticating, after the storing, the registered primary vehicle user;
providing, in response to successful authentication of the registered primary vehicle user during the authenticating, access to the personalization information for the registered primary vehicle user; and downloading, from the vehicle user database, at least a portion of the personalization information for the registered primary vehicle user to a vehicle currently being used by the registered primary vehicle user;

wherein the vehicle currently being used is not the vehicle for which the registered primary vehicle user is a registered primary vehicle user.

22. The non-transitory computer-readable medium according to claim 21, further comprising:

permitting a change to a first setting value on the vehicle by the driver that has not been authenticated as the registered primary vehicle user; and restoring, after the permitting and authenticating, the first setting value on the vehicle, based upon a setting value stored in the non-transitory memory.

* * * * *